United States Patent [19]

Hunt

[11] Patent Number: 5,287,532
[45] Date of Patent: Feb. 15, 1994

[54] PROCESSOR ELEMENTS HAVING MULTI-BYTE STRUCTURE SHIFT REGISTER FOR SHIFTING DATA EITHER BYTE WISE OR BIT WISE WITH SINGLE-BIT OUTPUT FORMED AT BIT POSITIONS THEREOF SPACED BY ONE BYTE

[75] Inventor: David J. Hunt, Wokingham, England

[73] Assignee: AMT (Holdings) Limited, Reading, England

[21] Appl. No.: 613,217

[22] Filed: Nov. 14, 1990

[30] Foreign Application Priority Data

Nov. 14, 1989 [GB] United Kingdom ............... 8925723

[51] Int. Cl.⁵ ............................................. G06F 15/16
[52] U.S. Cl. ............................ 395/800; 364/931.41; 364/926.5; 364/947.6; 364/965.6; 364/DIG. 2
[58] Field of Search ............... 395/800, 425; 364/716, 364/926.4, 926.5, 936.5, 947.6, 965.6

[56] References Cited

U.S. PATENT DOCUMENTS

| | | | |
|---|---|---|---|
| 3,979,729 | 9/1976 | Reddaway | 395/800 |
| 4,144,566 | 3/1979 | Timsit | 395/800 |
| 4,314,349 | 2/1982 | Batcher | 364/716 |
| 4,502,111 | 2/1985 | Riffe et al. | 395/775 |
| 4,580,214 | 4/1986 | Kubo et al. | 395/425 |
| 4,739,474 | 4/1988 | Holsztynski | 395/800 |
| 4,747,081 | 5/1988 | Heilveil et al. | 365/240 |
| 4,773,045 | 9/1988 | Ogawa | 365/220 |
| 4,843,382 | 6/1989 | Robert et al. | 340/825.79 |
| 4,972,495 | 11/1990 | Blike et al. | 382/22 |

FOREIGN PATENT DOCUMENTS 2180968  4/1987  United Kingdom .

*Primary Examiner*—Thomas C. Lee
*Assistant Examiner*—Meng-Ai T. An
*Attorney, Agent, or Firm*—Poms, Smith, Lande & Rose

[57] ABSTRACT

A processor array (2) employs an SIMD architecture and includes a number of single-bit processor elements. Each processor element includes an arithmetic unit (ALU) and at least one operand register (Q) for the arithmetic unit (ALU). Each processor element (PE) further includes a multi-byte bit-wise shift register. Data outputs are formed in said shift register for each byte position. Data is communicated from a selected one of the outputs to the arithmetic unit via a multiplexer (Z-MUX).

In one example, the shift register is unidirectional and includes a cyclical data path which connects the least significant bit of the register to the most significant end. The register may output data from one of the outputs and shift data cyclically from the most significant to the least significant end in a single operation.

8 Claims, 1 Drawing Sheet

PROCESSOR ELEMENTS HAVING MULTI-BYTE STRUCTURE SHIFT REGISTER FOR SHIFTING DATA EITHER BYTE WISE OR BIT WISE WITH SINGLE-BIT OUTPUT FORMED AT BIT POSITIONS THEREOF SPACED BY ONE BYTE

BACKGROUND OF THE INVENTION

The present invention relates to parallel processing computer systems and in particular to systems employing an array of processor elements using an SIMD architecture. One example of such a system is described and claimed in U.K Patent GB-A-1445714 and corresponding U.S. Pat. No. 3,979,728.

A number of different approaches have been adopted to increasing the power of such systems. It is possible to increase the power of individual processor elements by, for example, increasing the width of the operands handled by the ALU or increasing the range of functions offered by each ALU. Such approaches suffer the disadvantage of tending to lose the flexibility in operation and high levels of integration which are the primary design goals of SIMD systems. They also offer poor compatibility with existing systems based on simple single bit processor elements. In practice using processor elements modified in this manner to replace a conventional array requires that the operating systems for the array be rewritten from scratch and this provides a major disincentive to the upgrading of the array.

An alternative approach is to supplement an existing array with a co-processor. This has the advantage of providing greater backwards compatibility but has the disadvantage of tending to require software which is less integrated in nature, requiring entire routines to be implemented either in the main array or in the co-processor.

With single bit processors it is necessary, within an arithmetic operation such as floating point add, repeatedly to access bits of the operands and intermediate results in memory. One approach to increasing the memory bandwidth would be to provide for each processor several independent paths to memory. This would imply either more than one memory per processor, or multiple ports into a single memory. Either of these is more costly than providing just a single memory path. The cost is even higher if the processors are on a chip and the memory is external to the chip, thus requiring more data pins for the chip. It is known, in a convolution processing system for handling image data, to connect the output of an arithmetic unit to a shift register. A selected output of the shift register is then connected to the input of a neighbouring arithmetic unit. Such an arrangement is disclosed in U.K. Patent GB-A-2180968 and its corresponding U.S. Pat. No. 4,907,182.

SUMMARY OF THE INVENTION

According to the present invention, in a processor array employing an SIMD architecture, the array comprising a plurality of single-bit processor elements, each processor element including an arithmetic unit and at least one operand register for the arithmetic unit, each processor element further includes a multi-byte bit-wise shift register including data outputs for each byte position and a multiplexer arranged to communicate data from a selected one of the outputs to the arithmetic unit.

The present invention provides a system with greatly increased power in handling byte or multi-byte operands while retaining a simple single-bit structure for the processor elements, built around an arithmetic unit substantially identical to those used in existing systems. The array of the present invention therefore offers high levels of compatibility with conventional single-bit arrays. Having a shift register associated with each processor implemented within the processor chip, provides a specialized form of storage more cheaply than changing the memory configuration. Such a shift register provides a form of read port and a form of write port that can be used at the same time as an access to the normal memory. One of the advantages of a bit organized processor is that it is very flexible in being able to process a variety of wordlengths, and the present invention provides this flexibility also when the shift register is in use.

It has previously been proposed to modify the existing operand or "accumulator" register of a processor element to include a shift register. Such an arrangement is disclosed in the paper "architecture and operation of the BLITZEN processing element", E. W. Davis et al, Proceedings of the Third International Conference on Supercomputers, Boston, Mass., May 1988 pp128-137. Although such an arrangement provides some of the flexibility of the present invention in dealing with operands more than one bit long, it suffers a number of disadvantages. In particular, by using one of the main operand registers of the processor elements for the shifting of data, constraints are placed on the shifting operation so that it cannot be carried out in parallel with the operation of the ALU. These constraints can to some degree be overcome by, for example, making the shifter bi-directional, but this then adds significantly to the cost and complexity of the processor element and reduces the level of integration which can be achieved. The complexity of the BLITZEN processor is further increased by the need selectively to bypass sections of the register.

Preferably the data output from the shift-register is multiplexed with the at least one operand register to provide an alternative operand register for the ALU.

Preferably the shift register is unidirectional and includes a cyclical data path connecting the least significant bit of the register to the most significant end. Preferably the shift-register is arranged to output data from the selected one of its outputs and to shift data cyclically from the most significant to the least significant end in a single operation.

Preferably the shift register includes an input for data from the sum output of the ALU multiplexed with the input from the cyclical data path at the most significant end of the register.

Preferably the processor element includes an activity register in which case the register may be arranged to shift data conditionally dependent upon the value stored in the activity register. The register may be arranged also to shift data unconditionally.

A processor array in accordance with the present invention will now be described in detail with reference to the accompanying drawings in which:

DESCRIPTION OF PREFERRED EMBODIMENT

A processor array system comprises a scalar control processor or MCU 1 and an array 2 of processor elements PE. The array 2 is divided into a number of sub-arrays S1 ... S4.

The array system is typically used in conjunction with a host computer (not shown). The structure of the array 2 is generally similar to that described in the applicant's co-pending European application numbers 89313368.6 and 89313365.2, corresponding respectively to U.S. patent applications Ser. No. 454,053 for Processor Array, filed Dec. 19, 1989 of Thorpe, et al, now abandoned and Ser. No. 454,754 for Processor Array of Thorpe, et al, now abandoned although differing in details of the construction of each processor element, as described in further detail below.

Figure 1:
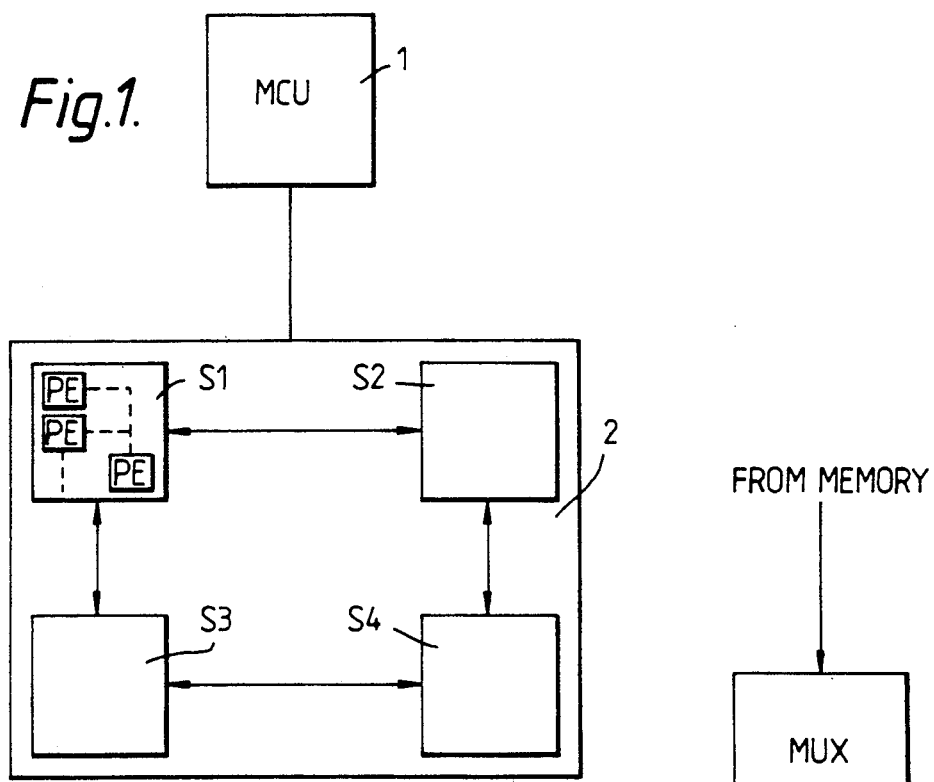
FIG. 1 is a block diagram of a processor array system.
Figure 2:
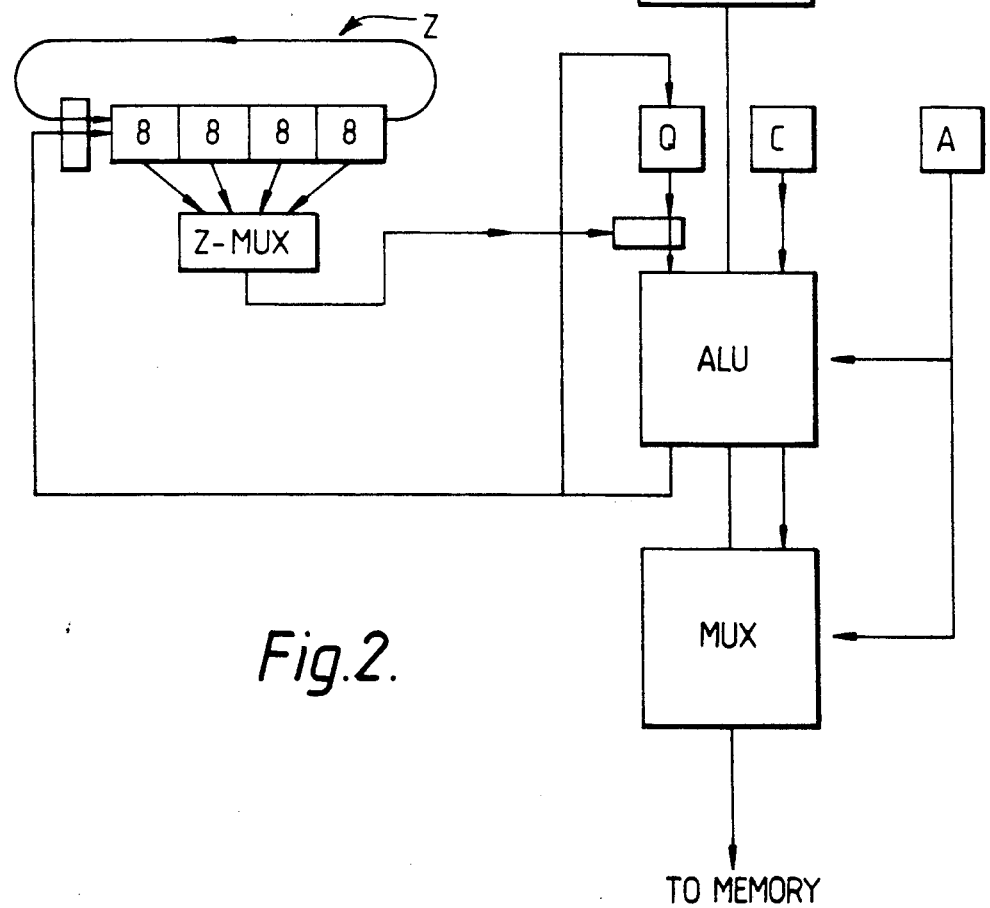
FIG. 2 is a diagram of a processor element for use in the system of FIG. 1.

As shown in FIG. 2, each processor element includes an arithmetic unit ALU, an accumulator register Q and a carry register C, both arranged to provide data inputs to the arithmetic unit ALU.

The arithmetic unit ALU is also provided with direct data inputs and outputs from memory via multiplexers MUX. In addition to on-chip memory the store for each processor element may include a region of off-chip memory.

The data input to the ALU from the accumulator register Q is multiplexed with an input from a shift register system Z. The shift register system Z includes a unidirectional shift register which, in the present example, is 32 bits long. Four data outputs are provided at positions separated by 8 bits and a selected one of these outputs is communicated to the ALU via an output multiplexer Z-MUX. Although in the present example only four outputs are provided other arrangements are possible in which, for example, eight outputs are used, with a separation between outputs of four bits.

A cyclical connection is provided from the least significant end of the shift register to its most significant end. This input at the most significant end is multiplexed with the sum output of the ALU. The register Z is arranged to shift data bit-wise from left to right with a cyclical shift from the least significant to the most significant bit. This operation may be carried out at the same time as using a bit of the register Z as operand.

As described below, the use of the shift register system Z reduces the cost in number of cycles of a variety of different PE functions.

During a multiply operation, the shift register acts as an accumulator and in a single cycle both supplies an operand bit and receives a result bit. The current multiplier bit is held in the A register and controls the shifting, thus effectively inhibiting the add where the multiplier bit is false. The use of activity registers in controlling the function of a PE is described in the above applicants' cited patent. Using the shift register Z in this manner, the inner work of the multiplier function takes just one cycle per bit, instead of the three cycles required with conventional arrays. The multiply function when implemented in this manner is most efficient for word lengths (or mantissa) up to 32 bits, but longer operations can be done in sections with the partial results being added afterwards.

In practice implementations of floating point add and multiply code for 32 bit precision using the Z register have been found to be about a factor of two faster (in terms of clock cycles) than equivalent routines in conventional arrays. Their operation is summarised below:

1. In multiply, the mantissa work is similar to the fixed point case. There is a stage of normalization which is done by shifting the register. The exponent work involves an activity controlled merge into the shift register to allow for the case when a zero result is to be produced; this is faster than performing an activity controlled write to store.

2. The first step in a floating point add operation is to identify and select the larger and smaller operands. This is done by loading the first operand into the shift register, comparing with the second, and setting activity according to the result. Then the second operand is merged into the shift register and the result written to memory as the large operand. Similarly the small operand mantissa can be obtained in the shift register by a load followed by a conditional load. Alignment is done by conditionally shifting the register. Then an add and a subtract, each under activity control, are done. Normalization involves testing groups of bits and conditionally shifting; since only right shifts are available, the "normal" position of the mantissa is effectively shifted around at each stage. As seen above, in implementing floating point add, for example, it is necessary to shift data to the right (towards the least significant end) for alignment of the mantissas, or towards the left (most significant end) for normalization.

In the present invention the shift register is simplified, by comparison with prior art processors, by only being shiftable to the right (rather than being bidirectional), and in that the entire register is always shifted. The effect of a variable length register is achieved, when required, by being able to select the register output from any one of a number of positions along the register. This means that when using (or 'reading') the register contents, the register acts more like a random access memory. For example a 32 bit register could be used to hold four different data items each of eight bits, and a bit from any of these data items could be selected as operand.

The effect of a conditional left shift may be achieved by performing a conditional right shift by the same distance, but with the condition for the shift being inverted. For example, consider the mantissa of a floating point number held in the shift register as follows:

| 0 | 1 | 2 | 3 | ← byte numbers in the shift register |
|---|---|---|---|---|
| — | 0 | 1 | 2 | ← byte numbers of the data |

Byte 0 is the most significant in both the register and the data. In this example the contents of byte 0 in the register is unimportant. It is required to perform a normalization shift of one byte to the left, and it is assumed that it is already known whether byte 0 of the data has value zero, or not. Conceptually the required result is a conditional left shift giving the following:

| 0 | 1 | 2 | 3 | ← byte numbers in the shift register |
|---|---|---|---|---|
| — | 0 | 1 | 2 | ← data if byte 0 is non-zero |
| — | 1 | 2 | — | ← data if byte 0 is zero |

An equivalent effect can be achieve by a conditional right shift:

| 0 | 1 | 2 | 3 | ← byte numbers in the shift register |
|---|---|---|---|---|
| 2 | — | 0 | 1 | ← data if byte 0 is non-zero |

| | | 1 | 2 | ← data if byte 0 is zero |
|---|---|---|---|---|

Thus after the conditional shift it is necessary to interpret byte 2 of the shift register hardware as containing the most significant byte of the data, but this is possible if the register outputs are selectable as proposed in this invention. Notice also that it was necessary to have a cyclic connection over the entire length of the shift register, since the least significant byte of the data may in this example be shifted around to occupy byte 0 of the register.

In fixed point operations, the shift register could be used as an accumulator within a sequence of arithmetic operations.

The functions described above, and in particular, the inner work of multiply are fundamental to many other bit level algorithms and so the advantages of a speed increase up to a factor of 2 can be achieved across a wide range of operations.

Many of the operations of conventional single-bit arrays can be implemented in the array of the present invention with only a small modification of the appropriate code. The address that selects which of the outputs of the Z register to use as operand is common to all the processors in the array and is generated by the MCU in a manner similar to the other addresses used in the system. For example a PE chip having eight rows of PEs will typically receive a three bit address used by some instructions to specify one of those eight rows. It may be convenient for this three bit address value to be able also to select one of eight outputs from the Z register, though clearly it is not meaningful for it to do this in an instruction requiring row selection.

A single instruction bit may be used to specify that Z is used as operand and/or result instead of Q, rather than distinguishing operands and result separately. This does preclude direct copies between Q and Z, although copies from Z to A are permitted.

The specified output of Z is multiplexed with the Q register output, and the result used both as input to the adder/ALU and in the input multiplexer. When Z is selected it may be shifted right one place, and a number of options are possible:
1. Z not clocked;
2. Some output of adder/ALU clocked into Z (one place right shift)
3. Some output of adder/ALU clocked into Z (one place right shift) conditional on activity.
4. Least significant output of Z clocked into Z (one place right cyclic shift)

These options may be encoded in two control bits which are common to all the PEs.

I claim:

1. A processor array employing an SIMD architecture, said processor array comprising a plurality of single-bit processor elements, each said single bit processor element including an arithmetic unit and at least one operand register connected to an input of said arithmetic unit, wherein each said single-bit processor element further comprises shift register means having a multi-byte structure and configured for shifting data either byte-wise or bite-wise, said shift register means having an input connected to receive an output of said arithmetic unit, a plurality of single-bit shift register data outputs formed in said shift register means at bit positions thereof spaced by one byte, multiplexer means having a plurality of single-bit inputs and a single-bit output, said single-bit shift register data outputs being connected to said single-bit inputs of said multiplexer means, and said single bit output of said multiplexer means being connected to an input of said arithmetic unit, said multiplexer means thereby communicating a single bit of data from a selected one of said single-bit shift register data outputs to said arithmetic unit, said single-bit output from said multiplexer means being multiplexed with said at least one operand register at said input of said arithmetic unit, said shift register means thereby providing an alternative operand register for said arithmetic unit.

2. The array of claim 1, wherein said shift register means includes a least significant bit end containing a least significant bit and has a most significant bit end containing a most significant bit, and wherein said shift register means is unidirectional and includes a cyclical data path connecting the least significant bit of said shift register means to the most significant end of said shift register means.

3. The array of claim 2, wherein said shift register means include means for outputting data from said selected one of said single-bit shift register data outputs and for shifting data cyclically from said most significant bit end to said least significant bit end, in a single operation.

4. The array of claim 3, wherein said shift register means include an input for data from a sum output of said arithmetic unit multiplexed with said input from said cyclical data path at said most significant bit end of said register.

5. The array of claim 2, wherein each said single-bit processor element includes an activity register and wherein said shift register means is arranged to shift data conditionally dependent upon a value stored in said activity register.

6. A computer implemented method of operating a processor array employing an SIMD architecture, said array comprising a plurality of single-bit processor elements, each said single bit processor element including an arithmetic unit, at least one operand register for said arithmetic unit, and a shift register having a multi-byte structure and configured for shifting data either byte-wise or bit-wise including an input connected to an output of said arithmetic unit and a plurality of single-bit shift register data outputs at bit positions thereof spaced by one byte; said method including steps of:
shifting data bit-wise within said shift register;
outputting data as single bits via a single-bit multiplexer from a selected one of said plurality of single-bit shift register data outputs at bit positions thereof spaced by one byte;
multiplexing said selected one of said single-bit shift register data outputs via a second multiplexer with data from said at least one operand register; and
inputting to said arithmetic unit via said second multiplexer said selected one of said single-bit shift register data outputs and said data from said at least one operand register, said shift register means thereby providing an alternative operand register for said arithmetic unit.

7. The method of claim 6, wherein said shift register means includes a least significant bit end containing a least significant bit and has a most significant bit end containing a most significant bit, and wherein said shift register is unidirectional, said method including shifting data cyclically via a cyclical data path connecting the least significant bit end of said shift register to the most significant bit end.

8. The method of claim 7, wherein said shift register outputs data from said selected one of said single-bit shift register data outputs and shifts data cyclically from the most significant bit end to the least significant bit end in a single operation.

* * * * *